United States Patent
Petr et al.

(10) Patent No.: US 11,655,319 B2
(45) Date of Patent: May 23, 2023

(54) PROCESSING AID FOR FOAM MOLDING, A VINYL CHLORIDE RESIN-BASED FOAM MOLDING COMPOSITION COMPRISING THE SAME AND A FOAM MOLDED PRODUCT

(71) Applicant: Rohm and Haas Company, Philadephia, PA (US)

(72) Inventors: Michael T. Petr, Collegeville, PA (US); Paul R. Van Rheenen, Warminster, PA (US)

(73) Assignee: Rohm and Haas Company, Philadelphia, PA (US)

( * ) Notice: Subject to any disclaimer, the term of this patent is extended or adjusted under 35 U.S.C. 154(b) by 39 days.

(21) Appl. No.: 15/753,553

(22) PCT Filed: Aug. 31, 2016

(86) PCT No.: PCT/US2016/049719
§ 371 (c)(1),
(2) Date: Feb. 20, 2018

(87) PCT Pub. No.: WO2017/040677
PCT Pub. Date: Mar. 9, 2017

(65) Prior Publication Data
US 2018/0237606 A1    Aug. 23, 2018

Related U.S. Application Data

(60) Provisional application No. 62/212,122, filed on Aug. 31, 2015.

(51) Int. Cl.
| | | |
|---|---|---|
| *C08F 220/18* | (2006.01) | |
| *C08F 110/02* | (2006.01) | |
| *C08J 9/228* | (2006.01) | |
| *C08L 27/06* | (2006.01) | |
| *C08F 110/06* | (2006.01) | |

(52) U.S. Cl.
CPC ...... *C08F 220/1802* (2020.02); *C08F 110/02* (2013.01); *C08F 110/06* (2013.01); *C08J 9/228* (2013.01); *C08L 27/06* (2013.01); *C08F 220/1803* (2020.02); *C08F 2800/20* (2013.01); *C08J 2201/022* (2013.01); *C08J 2205/08* (2013.01); *C08J 2205/10* (2013.01); *C08J 2327/06* (2013.01)

(58) Field of Classification Search
CPC .. C08J 9/228; C08J 2327/06; C08J 2201/022; C08J 2205/08; C08J 2205/10; C08J 9/0061; C08F 110/02; C08F 110/06; C08F 220/18; C08F 220/1803; C08F 2800/20; C08F 220/1802; C08F 220/14; C08L 27/06; C08L 33/10; B29C 48/0012
See application file for complete search history.

(56) References Cited

U.S. PATENT DOCUMENTS

| | | | |
|---|---|---|---|
| 5,055,529 A | 10/1991 | Kishida et al. | |
| 6,143,852 A * | 11/2000 | Harrison | C08F 220/14 526/319 |
| 6,391,976 B1 | 5/2002 | Naka et al. | |
| 8,178,619 B2 * | 5/2012 | Sato | C08F 220/14 525/228 |
| 2014/0371396 A1 | 12/2014 | Van Rheenen et al. | |
| 2015/0183944 A1 | 7/2015 | Guo et al. | |
| 2016/0237297 A1* | 8/2016 | Kuwahara | H01B 3/443 |

FOREIGN PATENT DOCUMENTS

| | | | |
|---|---|---|---|
| CA | 2180282 A * | 12/1996 | ............. C08L 63/10 |
| GB | 1069848 | 5/1967 | |
| GB | 1378434 | 12/1974 | |
| WO | WO 2010/061630 | 6/2010 | |
| WO | WO 2013/095876 | 6/2013 | |
| WO | WO 2015/045928 | 4/2015 | |
| WO | WO 2015/045930 | 4/2015 | |
| WO | WO 002015045930 | 4/2015 | |

OTHER PUBLICATIONS

Ozer et al., Methacrylate-Based Nanoparticles Produced by Microemulsion Polymerization, Journal of Applied Polymer Scince, vol. 78, 569-575 (2000). (Year: 2000).*
EP Office Action; from counterpart EP Application No. 16766730.02.
PCT Search Report dated Oct. 11, 2016; from counterpart PCT Application No. PCT/US2016/049719.
PCT IPRP dated Mar. 6, 2018; from counterpart PCT Application No. PCT/US2016/049719.
Chinese Office Action; from counterpart Chinese Application No. 201680048183.1.

* cited by examiner

*Primary Examiner* — Kara B Boyle

(57) ABSTRACT

A processing aid for foam molding comprising a copolymer obtained by the polymerization of from 50% to 100% by weight total of one or more monomers selected from the group consisting of ethyl methacrylate and propyl methacrylate, and 0 to 50% by weight of other copolymerizable monomers, the copolymer having the following properties: (a) a reduced viscosity measured according to ASTM D2857 at 1 mg/mL in chloroform at 25° C. of greater than 8 dL/g and (b) a Tg equal to or less than 77° C. is provided.

6 Claims, No Drawings

PROCESSING AID FOR FOAM MOLDING, A VINYL CHLORIDE RESIN-BASED FOAM MOLDING COMPOSITION COMPRISING THE SAME AND A FOAM MOLDED PRODUCT

FIELD OF INVENTION

This invention relates to a processing aid for foam molding, a process for foam molding using the processing aid, a vinyl chloride resin-based foam molding composition comprising the processing aid, and a foam molded product formed.

BACKGROUND OF THE INVENTION

In the building and construction industry, poly(vinyl chloride) (PVC) is often used in a foamed form. The foam is produced by formulation with a chemical blowing agent and a high molecular weight process aid. During extrusion, the blowing agent decomposes producing a gas dissolved in the high pressure PVC melt. As it exits the die and the pressure drops, the gas forms bubbles that expand the PVC two to three times its original volume. At this point, the PVC bubbles collapse, so the high molecular weight process aid is added to increase the melt viscosity and provide entanglements to prevent the PVC melt from relaxing as well as to provide extra die swell and further foam expansion. Commercial foam process aids are extremely high molecular weight, usually 1-20 Mg/mol, poly(methyl methacrylate) copolymers with up to 30% of other polyacrylics.

There are three main variables that affect the efficiency of foam process aids: molecular weight, molecular architecture, and glass transition temperature ($T_g$). In general, higher molecular weight produces higher foam expansion because it has a higher melt viscosity and provides more entanglements, and less branching and crosslinking produces higher foam expansion because the polymer can better mix into the PVC. On the other hand, there appears to be an optimum $T_g$ to both provide a high melt viscosity but still be able to disentangle during extrusion. Typically, to provide these properties 15-20% total of either/both ethyl acrylate (EA) or butyl acrylate (BA) are used. With either EA or BA, the resulting copolymer has a lower molecular weight than any of the constituent homopolymers because the cross-propagation of MMA to EA or BA is very slow. BA promotes significant crosslinking because of the tertiary hydrogens in the backbone of the polymer are susceptible to abstraction. Therefore, improved foaming aids are still desired in the field.

SUMMARY OF THE INVENTION

In a first embodiment, the disclosure provides a processing aid for foam molding comprising a copolymer obtained by the polymerization of from 50% to 100% by weight total of one or more monomers selected from the group consisting of ethyl methacrylate and propyl methacrylate, and 0 to 50% by weight of other copolymerizable monomers, the copolymer having the following properties: (a) a reduced viscosity measured according to ASTM D2857 at 1 mg/mL in chloroform at 25° C. of greater than 8 dL/g and (b) a Tg equal to or less than 77° C.

In a second embodiment, the disclosure provides a vinyl chloride resin-based foam molding composition comprising 100 parts by weight of a vinyl chloride resin and 1 to 25 parts by weight of a processing aid for foam molding use according to any embodiment disclosed herein.

In a third embodiment, the disclosure provides a foam molded product formed from a vinyl chloride resin-based foam molding composition according to any embodiment disclosed herein.

DETAILED DESCRIPTION OF THE INVENTION

The processing aid for foam molding comprises a copolymer obtained by the polymerization of from 50% to 100% by weight total of one or more monomers selected from the group consisting of ethyl methacrylate and propyl methacrylate. All individual values and subranges from 50 to 100% by weight are included and disclosed herein; for example, the total weigh percent of one or more monomers selected from the group consisting of ethyl methacrylate and propyl methacrylate may range from a lower limit of 50, 60, 70, 80, or 90 weight % to an upper limit of 55, 65, 75, 85, 95 or 100 weight %. The processing aid for foam molding comprises a copolymer obtained by the polymerization of from 50% to 100% by weight total of one or more monomers selected from the group consisting of ethyl methacrylate and propyl methacrylate, or in the alternative, from 50% to 75% by weight total of one or more monomers selected from the group consisting of ethyl methacrylate and propyl methacrylate, or in the alternative, from 75% to 100% by weight total of one or more monomers selected from the group consisting of ethyl methacrylate and propyl methacrylate, or in the alternative, from 60% to 90% by weight total of one or more monomers selected from the group consisting of ethyl methacrylate and propyl methacrylate, or in the alternative, from 50% to 95% by weight total of one or more monomers selected from the group consisting of ethyl methacrylate and propyl methacrylate, or in the alternative, from 50% to 98% by weight total of one or more monomers selected from the group consisting of ethyl methacrylate and propyl methacrylate, or in the alternative, from 50% to less than 100% by weight total of one or more monomers selected from the group consisting of ethyl methacrylate and propyl methacrylate.

The processing aid for foam molding comprises a copolymer obtained by the polymerization of from 0 to 50% by weight of other copolymerizable monomers. All individual values and subranges from 0 to 50% by weight of other copolymerizable monomers are included and disclosed herein; for example, the weight percent of other copolymerizable monomers may range from a lower limit of 0, 10, 20, 30, or 40% to an upper limit of 5, 15, 25, 35, 45 or 50% by weight. The processing aid for foam molding comprises a copolymer obtained by the polymerization of from 0 to 50% by weight of other copolymerizable monomers, or in the alternative, 0 to 25% by weight of other copolymerizable monomers, or in the alternative, 25 to 50% by weight of other copolymerizable monomers, or in the alternative, 10 to 40% by weight of other copolymerizable monomers, or in the alternative, 5 to 50% by weight of other copolymerizable monomers, or in the alternative, 2 to 50% by weight of other copolymerizable monomers, or in the alternative, greater than 0 to 50% by weight of other copolymerizable monomers.

The other copolymerizable monomers include any monomer which may be copolymerized with methacrylates. Such monomers include, for example, alkyl acrylates, alkyl methacrylates, crosslinking agents and graftlinking agents. Exemplary monomers include, methyl methacrylate, methyl acrylate, ethyl acrylate, propyl acrylate, butyl acrylate, ethylhexyl acrylate (EHA), octyl acrylate, ethyl methacrylate, propyl methacrylate, butyl methacrylate, pentyl methacrylate, hexyl methacrylate, ethylhexyl methacrylate (EHMA), octyl methacrylate, styrene, vinyl acetate, acetoacetoxyethyl methacrylate, acrylic acid, methacrylic acid, acrylamide, methacrylamide, glycidyl methacrylate, maleic anhydride., In a particular embodiment, the copolymer is obtained by polymerization of 50 to 100% by weight of propyl methacrylate and 0 to 50% by weight of methyl methacrylate in the absence of any other copolymerizable monomers.

In a particular embodiment the copolymer is obtained by polymerization of 80 to 100% by weight of ethyl methacrylate and 0 to 20% by weight of methyl methacrylate in the absence of any other copolymerizable monomers.

In yet another embodiment, the disclosure provides a processing aid for foam molding consisting of a copolymer obtained by the polymerization of from 50% to 100% by weight total of one or more monomers selected from the group consisting of ethyl methacrylate and propyl methacrylate, and 0 to 50% by weight of other copolymerizable monomers, the copolymer having the following properties: (a) a reduced viscosity measured according to ASTM D2857 at 1 mg/mL in chloroform at 25° C. of greater than 8 dL/g and (b) a Tg equal to or less than 77° C.

In yet another embodiment, the disclosure provides a processing aid for foam molding consisting essentially of a copolymer obtained by the polymerization of from 50% to 100% by weight total of one or more monomers selected from the group consisting of ethyl methacrylate and propyl methacrylate, and 0 to 50% by weight of other copolymerizable monomers, the copolymer having the following properties: (a) a reduced viscosity measured according to ASTM D2857 at 1 mg/mL in chloroform at 25° C. of greater than 8 dL/g and (b) a Tg equal to or less than 77° C.

The resulting processing aid for foam molding exhibits a reduced viscosity measured according to ASTM D2857 at 1 mg/mL in chloroform at 25° C. of greater than 8 dL/g. All individual values and subranges from greater than 8 dl/g are included and disclosed herein. For example, the processing aid for foam molding may exhibit a reduced viscosity of greater than 8 dL/g, or in the alternative, greater than 9 dL/g, or in the alternative, greater than 10 dL/g, or in the alternative, greater than 11 dL/g, or in the alternative, greater than 14 dL/g, or in the alternative, greater than 17 dL/g.

The processing aid for foam molding may be made using any known emulsion polymerization method.

The most common extrusion practices involve free foaming out of the die followed by some type of calibration and the Celuka or integrated skin process. A description of these PVC foaming processes and typical formulation ingredients can be found in the Handbook of Polymeric Foams and Foam Technology, Ed. Klemper, D., Sendijarevic, V., 2.sup.nd edition, Hanser Publishers, Munich, 2004 chapter 9.

In an alternative embodiment, the processing aid for foam molding is made using a multi-stage emulsion polymerization process. Such processes are disclosed in U.S. Patent Application Publications 2015/0183944 and 2014/0371396, the disclosures of which are incorporated herein by reference.

The processing aids for foam molding are typically isolated to form a free-flowing powder or pellets, the powder particles having a 50-500 micron mean diameter.

The vinyl chloride resin-based foam molding composition disclosed herein comprises 100 parts by weight of a vinyl chloride resin and 1 to 25 parts by weight of the processing aid for foam molding use according to any embodiment disclosed herein. All individual values and subranges from 1 to 25 parts by weight of the processing aid are disclosed and included herein; for example, the amount of processing aid in the vinyl chloride-based foam molding composition can range from a lower limit of 1, 3, 6, 9, 12, 15 or 18 parts by weight to an upper limit of 2, 5, 8, 11, 14, 17, 20, or 25 parts by weight. For example, the amount of processing aid in the vinyl chloride-based foam molding composition may be from 1 to 25 parts by weight, or in the alternative, from 1 to 12 parts by weight, or in the alternative, from 12 to 25 parts by weight, or in the alternative, from 8 to 18 parts by weight.

In an alternative embodiment, the vinyl chloride resin-based foam molding composition may comprise one or more additives selected from the group consisting of thermal stabilizers, lubricants, impact modifiers, fillers, pigments or other coloring agents, or other processing aids for impacting properties other than foaming.

The disclosure further provides a foam molded product formed from a vinyl chloride resin-based foam molding composition according to any embodiment disclosed herein.

In a particular embodiment, the foam molded product is a foamed structural component.

In an alternative embodiment, the disclosure provides a processing aid for foam molding, vinyl chloride resin-based foam molding composition and a foam molded product according to any embodiment disclosed herein, except that the vinyl chloride resin-based foam molding composition exhibits a foam expansion of equal to or greater than 130%. All individual values and subranges from equal to or greater than 130% are included and disclosed herein. For example, the vinyl chloride resin-based foam molding composition may exhibit a foam expansion of equal to or greater than 130%, or in the alternative, equal to or greater than 132%, or in the alternative, equal to or greater than 135%, or in the alternative, equal to or greater than 138%.

The disclosure further provides a process for foam molding a vinyl chloride resin comprising extruding a vinyl chloride resin-based foam molding composition which comprises 100 parts by weight of a vinyl chloride resin and 1 to 25 parts by weight of a processing aid according to any embodiment disclosed herein.

EXAMPLES

The following examples illustrate the present invention but are not intended to limit the scope of the invention.

All examples were prepared as follows using the various monomer compositions in Error! Reference source not found..

Emulsion polymerization was used to make the foam process aids. An emulsion of monomers, DOWFAX 2A1, and water was mixed and added to a reaction flask. After inerting the contents, polymerization was initiated with a sodium formaldehyde sulfoxylate and sodium persulfate redox initiator system catalyzed by an iron salt. Upon completion of the polymerization, the latex was cooled and dried. DOWFAX 2A1 is an alkyldiphenyloxide disulfonate surfactant which is commercially available from The Dow Chemical Company (Midland, Mich., USA).

The processing aids for foam molding, Inventive Examples 1-2 and Comparative Examples 1-5, were used in foam molding a polyvinyl chloride resin as described in PCT Publication WO 2013/095876, the disclosure of which is incorporated herein by reference in its entirety. The processing aids were added at a level of 7.2 phr. PCT Publication WO 2013/095876 further describes the method for measuring the foam expansion used herein. Table 1 further provides the foam expansion results for each of the example processing aids. Reduced viscosity is measured according to ASTM D2857 at 1 mg/mL in chloroform at 25° C. Table 2 provides the reduced viscosity measurements for certain Inventive and Comparative Examples.

TABLE 1

Example monomer compositions and foam expansions.

| Example ID | Composition | Foam Expansion |
| --- | --- | --- |
| Inventive Example 1 | 100% EMA | 155% |
| Inventive Example 2 | 20% MMA 80% EMA | 150% |
| Comparative Example 1 | 82% MMA 18% BA | 128% |
| Comparative Example 2 | 82% MMA 18% EA | 134% |
| Comparative Example 3 | 83.5% MMA 4.9% BA 11.6% EA | 138% |
| Comparative Example 4 | 84% MMA 16% EHA | 116% |
| Comparative Example 5 | 72% MMA 28% EHMA | 132% |

TABLE 2

Example monomer compositions and reduced viscosities.

| Example ID | Composition | Reduced Viscosity (dL/g) |
| --- | --- | --- |
| Inventive Example 1 | 100% EMA | 19.04 |
| Inventive Example 2 | 20% MMA 80% EMA | 18.79 |
| Comparative Example 1 | 82% MMA 18% BA | 14.20 |
| Comparative Example 2 | 82% MMA 18% EA | 18.90 |
| Comparative Example 5 | 72% MMA 28% EHMA | 17.17 |

We claim:

1. A processing aid for foam molding comprising a copolymer obtained by the polymerization of about 80% by weight of ethyl methacrylate and about 20% by weight of methyl methacrylate in the absence of any other copolymerizable monomers, the copolymer having the following properties: (a) a reduced viscosity measured according to ASTM D2857 at 1 mg/mL in chloroform at 25° C. of greater than 17 dL/g and (b) a Tg equal to or less than 77° C., wherein the processing aid is in the form of free-flowing powder particles, the powder particles having having a 50-500 micron mean diameter.

2. A vinyl chloride resin-based foam molding composition comprising 100 parts by weight of a vinyl chloride resin and 1 to 25 parts by weight of a processing aid for foam molding use according to claim 1.

3. The vinyl chloride resin-based foam molding composition according to claim 2, wherein the vinyl chloride resin-based foam molding composition exhibits a foam expansion of about 150%.

4. A foam molded product formed from a vinyl chloride resin-based foam molding composition according to claim 2.

5. The foam molded product according to claim 4, wherein the product is a foamed structural component.

6. A process for foam molding a vinyl chloride resin comprising extruding the vinyl chloride resin-based foam molding composition according to claim 2.

* * * * *